United States Patent
Chacon-Caldera et al.

(10) Patent No.: US 12,471,796 B2
(45) Date of Patent: Nov. 18, 2025

(54) METHOD FOR ASSESSING AND/OR REDUCING ARTIFACTS ARISING FROM RECONSTRUCTION OF MPI IMAGE DATA AND SYSTEM FOR VISUAL REPRESENTATION OF MPI IMAGE DATA

(71) Applicant: Bruker BioSpin MRI GmbH, Ettlingen (DE)

(72) Inventors: Jorge Chacon-Caldera, Mannheim (DE); Jochen Franke, Karlsruhe (DE)

(73) Assignee: Bruker BioSpin MRI GmbH, Ettlingen (DE)

( * ) Notice: Subject to any disclaimer, the term of this patent is extended or adjusted under 35 U.S.C. 154(b) by 176 days.

(21) Appl. No.: 18/360,982

(22) Filed: Jul. 28, 2023

(65) Prior Publication Data

US 2024/0032813 A1 Feb. 1, 2024

(30) Foreign Application Priority Data

Aug. 1, 2022 (EP) .................................... 22188179

(51) Int. Cl.
*A61B 5/0515* (2021.01)
*G01R 33/12* (2006.01)
(Continued)

(52) U.S. Cl.
CPC ........ *A61B 5/0515* (2013.01); *G01R 33/1276* (2013.01); *G06T 5/50* (2013.01); *G06T 11/008* (2013.01); *G06T 2207/20224* (2013.01)

(58) Field of Classification Search
CPC .... A61B 5/0515; G01R 33/1276; G06T 5/50; G06T 11/008; G06T 2207/20224
See application file for complete search history.

(56) References Cited

U.S. PATENT DOCUMENTS

| | | | |
|---|---|---|---|
| 10,796,465 B2 | 10/2020 | Franke et al. | |
| 2012/0197115 A1* | 8/2012 | Pasmans | A61B 5/05 600/431 |

FOREIGN PATENT DOCUMENTS

| | | | |
|---|---|---|---|
| DE | 102018203784 A1 | 9/2019 | |
| DE | 102018203786 A1 | 9/2019 | |
| WO | WO-2014057396 A1 * | 4/2014 | ........... A61B 5/0515 |

OTHER PUBLICATIONS

J. Chacon-Caldera et al., Eigen-reconstructions: a closer look into the System Matrix, vol. 6 No. 2 Suppl. 1 (2020): Int J Mag Part Imag, ID2009072.
(Continued)

*Primary Examiner* — Daniel R Miller
(74) *Attorney, Agent, or Firm* — Benoît & Côté Inc.

(57) ABSTRACT

A method for assessing and/or reducing artifacts arising from reconstruction of magnetic particle imaging (MPI) total image data set (c(r)) from MPI signal data (s(f), u(t)) using an appended system matrix (SM_AB) comprises:
  a) reconstructing signal data (s(f), u(t)) using appended system matrix (SM_AB) derived from at least two system matrices (SM_A, SM_B) for generating input image data (cin(r));
  b) selecting at least one voxel as selected voxel from the input image data (cin(r)) for generating output image data (cout(r));
  c) determining eigen-reconstruction signal data $se_n(f)$ by selecting one or more line entries of the appended system matrix (SM_AB) that correspond to the selected voxel(s);
  d) reconstructing eigen-reconstruction signal data se(f) using the appended system matrix (SM_AB) for generating eigen-reconstruction image data ce(r); and
(Continued)

e) subtracting the eigen-reconstruction image data ce(r) or weighted eigen-reconstruction image data ce'(r) from the input image data cin(r) for generating updated input image data $cin_n'(r)$.

14 Claims, 5 Drawing Sheets

(51) Int. Cl.
  *G06T 5/50* (2006.01)
  *G06T 11/00* (2006.01)

(56) References Cited

OTHER PUBLICATIONS

J. Chacon-Caldera et al., Enhancing Spatial Resolution in Magnetic Particle Imaging Using Eigen-Reconstructions: Opportunities and Limitations, vol. 7 No. 2 (2021): Int J Mag Part Imag, ID 2112003.
A von Gladiss et al., Hybrid system calibration for multidimensional magnetic particle imaging, 2017 Phys. Med. Biol. 62, 3392.
Knopp et al., Efficient Joint Estimation of Tracer Distribution and Background Signals in Magnetic Particle Imaging Using a Dictionary Approach, IEEE transactions on medical imaging, vol. 40, No. 12, Dec. 2021, 3568.
Rahmer et al., First experimental evidence of the feasibility of multi-color magnetic particle imaging, 2015 Phys. Med. Biol. 60 1775.
Stehning et al., Simultaneous magnetic particle imaging (MPI) and temperature mapping using multi-color MPI. International Journal on Magnetic Particle Imaging vol. 2 No. 2, ID1612001 (2016).

* cited by examiner

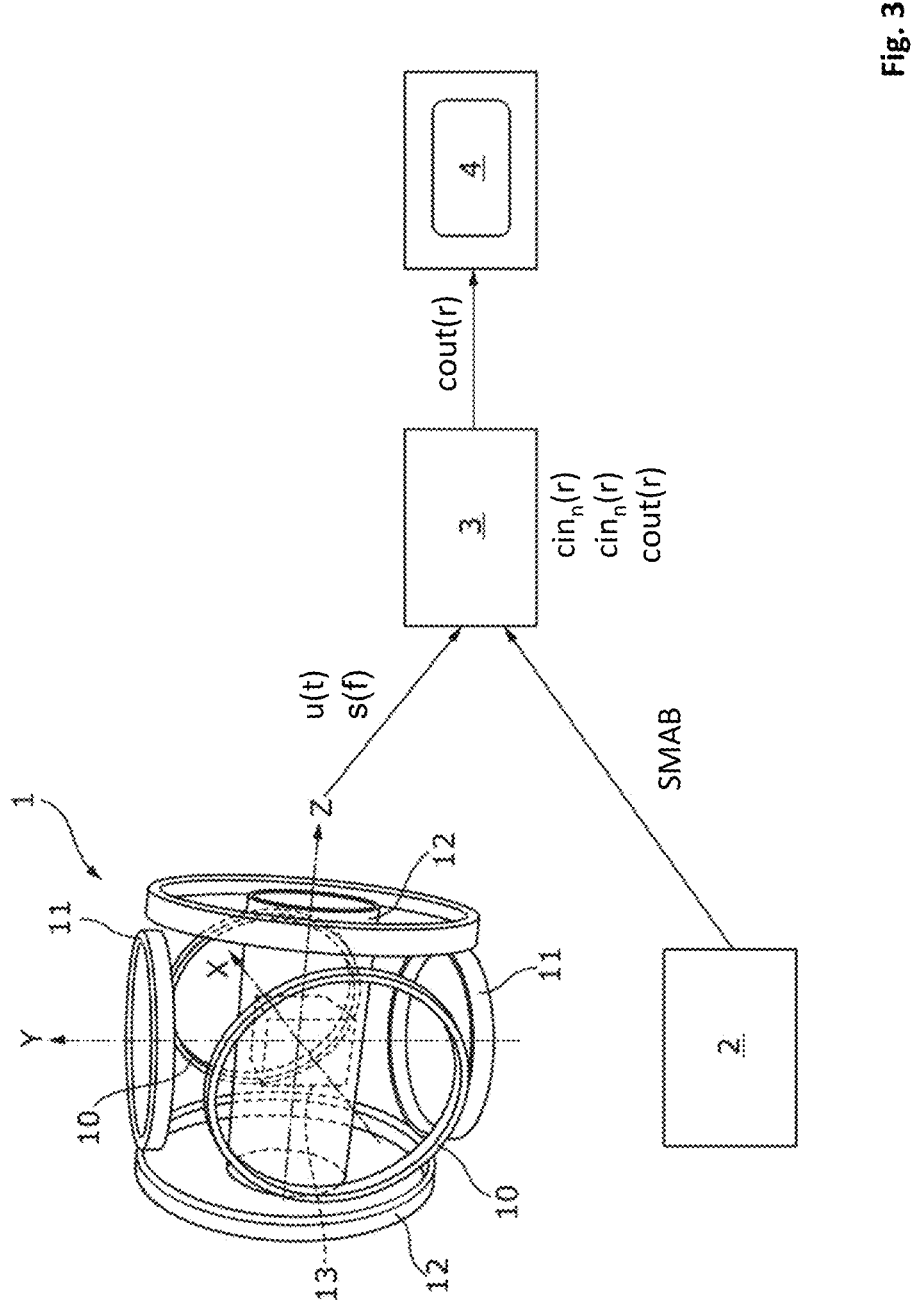

METHOD FOR ASSESSING AND/OR REDUCING ARTIFACTS ARISING FROM RECONSTRUCTION OF MPI IMAGE DATA AND SYSTEM FOR VISUAL REPRESENTATION OF MPI IMAGE DATA

BACKGROUND OF THE INVENTION

Field of the Invention

The invention concerns a method for assessing and/or reducing artifacts arising from reconstruction of a magnetic particle imaging (MPI) total image data set from MPI signal data. The invention further concerns a system for visual representation of MPI image data.

Description of the Related Art

In magnetic particle imaging (MPI) measurements, a spatially dependent magnetic field with a field-free region is applied. By applying a magnetic drive field, the field-free region is moved through an examination volume (FOV) along a trajectory with the aid of a measurement sequence in a drive-field region. The drive-field region is defined by the trajectory and part of the examination volume, with the examination volume being defined by a reconstruction region. The signal responses of magnetic particles, preferably superparamagnetic iron oxide particles (SPION), are measured as MPI signal data. The measured signal data are displayed as a sum signal of all excited particles. These are measured in the time domain and transformed into the frequency domain by a Fourier transform. A reconstruction is performed to produce the MPI input image data, e.g., using a system-function-based MPI image reconstruction.

In the case of a system-function-based MPI image reconstruction, knowledge of a spatially encoded system response (frequency response), a so-called system function, is used, the latter describing the relationship between the measurement signal (MPI signal data) and, for example, the particle distribution of a certain particle class (mapping the particle concentration on a measured frequency response). As a rule, the system function is available as a "system matrix", i.e., as discretized system function. The system matrix is provided for a system matrix region that comprises the part of the image domain where MPI image data are to be reconstructed. The system matrix provides the basis functions, which describe the signal response of a calibration sample at various spatial positions. The system matrix is determined independently of the actual object measurement (e.g., by calibration measurement, by simulation, by hybrid approaches). If the system matrix is determined experimentally (e.g., with a calibration measurement), the particle signal response of an (ideally punctiform) calibration sample is measured at a large number of spatial positions within a system matrix region.

MPI requires a tracer to produce images, wherein the tracer needs to provide a sufficient non-linear magnetization behavior as given for example in superparamagnetic iron oxide nanoparticles. These particles can vary in size, shape, and magnetic properties (i.e., belong to different particle classes). If a particle system differs in at least one parameter that influences the particle signal response, it forms different particle classes. In order to be able to distinguish between different particle classes, a plurality of system matrices are acquired, wherein the employed punctiform probe differs in at least one of the aforementioned parameters per system matrix. This means it is necessary to establish a plurality of system matrices (at least two system matrices) to determine different parameters through MPI. This parametric reconstruction technique is called "multi-color reconstruction," as discussed in Rahmer et al., *First experimental evidence of the feasibility of multi-color magnetic particle imaging*, 2015 Phys. Med. Biol. 60 1775 and Stehning et al., *Simultaneous magnetic particle imaging (MPI) and temperature mapping using multi-color MPI*, International Journal on Magnetic Particle Imaging 2.2 (2016).

The measured signal (MPI signal data s(f)) comprises signals generated by different particle classes. Following the so-called "multi-color" reconstruction, it is possible to image an object containing tracers of different particle classes (different tracer types) and reconstruct a separate image for each tracer type. Thus, the reconstructed input image data comprise image data of particles of different particle classes within the examination volume wherein the image data of different particle classes are separated within the input image data. However, artifacts will arise if the tracers are not distinctive enough. For example, an object with one tracer of particle class A will appear partially in the image A (where it is supposed to appear) and partially in the image B (where it is not supposed to appear). This is called "ghosting" and it is observed as a portion of the signal is misclassified and shown in the incorrect image as shown in FIGS. 4a, 4b, 4c.

FIG. 4a shows a (phantom) MPI sample S which comprises different (in this case: two) particle classes P1, P2. By using the standard image reconstruction based on the system-matrix-approach the two particle classes P1, P2 are visualized in the input image data cin(r) (system-function-based MPI image reconstruction) in different partial volumes SV_A, SV_B (number of partial volumes=number of system matrices that were appended to create the appended system matrix; in this case: 2). If all system matrices have the same dimensions, the MPI input image data comprises N.x.y.z voxels (with x, y, z=number of voxels of the examination volume in the various spatial directions; N=number of system matrices that were appended to create the appended system matrix). In the case of a correct reconstruction, the particle distribution of respectively one particle class P1, P2 should be presented in one partial volume SV_A or SV_B. Thus, an artifact-free reconstruction should yield the image shown in FIG. 4b. However, if the two particle classes P1, P2 do not differ sufficiently from one another, part of the signal of particle class P1 is reconstructed as ghost artifact G1 in the partial volume SV_B of particle class P2 and part of the signal of particle class P2 is reconstructed as ghost artifact G2 in the partial volume SV_A of particle class P1, as illustrated in FIG. 4c.

To date, only one approach has been presented to alleviate this problem, which involves a regularized forward and a non-regularized backward domain transformation, as discussed in U.S. Pat. No. 10,796,465 B2. Following this approach, two images are initially reconstructed using a forward regularized transformation. At that point, both images include artifacts. Then, every voxel is set to zero in one of the images. The purpose of this transformation is to emulate zero ghosting in one channel. This generates a "new" pair of images, which are backward transformed by multiplication with the respective system matrix. This signal is reconstructed again into an image with new intensity ratios between the true signal and the artifact. The process is then repeated for the remaining image. This process yields a map of signals and artifacts that can be subtracted from each other. These transformations are not only computationally expensive, but they can also cause additional artifacts and affect the tracer quantification. Furthermore, the performance of the method is oftentimes not satisfactory, leaving most of the artifact intact. In particular, the forward and backward transformations are not equivalent and thus, the ghosting will not be effectively isolated.

Whereas ghosting artifacts are artifacts of a signal in a partial volume belonging to a first particle class but are caused by a signal belonging to another particle class, blurring artifacts are artifacts of a signal belonging to a first particle class and caused by that signal itself.

In J. Chacon-Caldera et al., *Eigen-reconstructions: a closer look into the System Matrix*, Int J Mag Part Imag, Vol 6 No 2 Suppl 1 (2020) and J. Chacon-Caldera et al., *Enhancing Spatial Resolution in Magnetic Particle Imaging Using Eigen-Reconstructions: Opportunities and Limitations*, Int J Mag Part Imag, Vol 7 No 2 (2021), the concept of eigen-reconstructions was presented to reduce image blurring. Sample delta position measurements from the system matrix are reconstructed as test images (eigen-reconstruction of the system matrix). By testing different reconstruction parameters, it is possible to identify which parameters lead to blurring artifacts. The algorithm to reduce blurring using information from the eigen-reconstructions presented in both Chacon-Caldera publications works in a per-voxel basis and utilizes only forward reconstructions. The method uses readily available calibration measurements (as required for normal image reconstruction) to assess and remove artifacts from imperfect reconstructions. The Chacon-Caldera publications do not address reduction of ghosting artifacts in multi-color reconstruction.

A. von Gladiss et al., *Hybrid system calibration for multidimensional magnetic particle imaging*, 2017 Phys. Med. Biol. 62 3392 and Knopp et al., *Efficient Joint Estimation of Tracer Distribution and Background Signals in Magnetic Particle Imaging Using a Dictionary Approach*, EEE transactions on medical imaging, Vol. 40, NO. 12, DECEMBER 2021 disclose background correction with additional background signals in system matrices. Gladiss uses a background measurement while Knopp uses a dictionary. No correction is made for ghosting or blurring in Gladiss and Knopp.

SUMMARY OF THE INVENTION

The invention reduces both ghosting and blurring artifacts in multi-color reconstruction of MPI image data using a method and a system for visual representation of MPI image data described hereinafter.

The inventive method comprises:
a) Reconstruction of signal data by means of the appended system matrix derived from at least two system matrices for generating input image data,
b) Selection of at least one voxel as selected voxel(s) from the input image data for generating output image data,
c) Determining eigen-reconstruction signal data by selecting the line entry(entries) of the appended system matrix which corresponds to the at least one selected voxel,
d) Reconstruction of the eigen-reconstruction signal data using the appended system matrix for generating eigen-reconstruction image data; and
e) Subtraction of the eigen-reconstruction image data or of weighted eigen-reconstruction image data from the input image data for generating updated input image data.

By using an appended system matrix, a multi-parameter space is produced where image data of particles of different particle classes are presented in different partial volumes. Each partial volume comprises image data of a particle class for the predetermined examination volume in real space (image domain). According to the invention, eigen-reconstruction of selected voxels is performed in combination with reconstruction using the appended system matrix.

The spatial location of the selected voxel determines the line(s) of the appended system matrix, which is(are) selected as eigen-reconstruction signal data in step c). The line(s) of the system matrix corresponding to the selected voxel(s) (eigen-reconstruction signal data) is(are) reconstructed the same way as the original signal data, i.e., by using the appended system matrix. This process is called eigen-reconstruction. The resulting eigen-reconstruction image data comprise the selected voxel(s) as well as artifacts (blurring, ghosting) arising from the reconstruction. By subtracting the (preferably weighted) eigen-reconstruction image data from the input image data, artifacts (and correct reconstructed image corresponding to the selected voxel(s)) are successively removed from the input image data, resulting in updated input image data. The updated input image data can be used for further iterations of the method according to the invention.

To ensure that in step e) the correct intensity is subtracted from the input image data, it is preferred that prior to step e) the eigen-reconstruction image data obtained in step d) is multiplied with a weighting factor to obtain weighted eigen-reconstruction image data whose maximum intensity matches with the intensity of the selected voxel. The weighted eigen-reconstruction image data are used for subtraction in step e).

Alternatively, or in addition, the inventive method may comprise that prior to step d) the eigen-reconstruction signal data obtained in step c) is multiplied with a weighting factor to obtain weighted eigen-reconstruction signal data whose maximum intensity matches with the intensity of the selected voxel, and that in step d) the weighted eigen-reconstruction signal data are used for eigen-reconstruction. With this variant, one could force the spectral intensities to match rather than the image intensities. Thus, offsets generated by the reconstruction algorithm can be compensated.

In a highly preferred variant, steps b)-e) are repeated until a termination condition is met, wherein in step b) the selection is made from the updated input image data and that at least one selected voxel is added to the output image data. With each cycle, the output image data is updated by adding the newly selected voxel(s). The process is aborted when the termination condition is met.

In case no iteration is intended or the iteration is stopped before the termination condition is met, the updated input image data can be added to the output image data thereby creating supplemented output image data in order to avoid losing data in case of an early termination.

The output image data comprise the selected voxels of all iterations performed up to that point. Since the selections made in the iterations are based on updated input image data (where artifacts and the actual image information of already selected voxels have been removed) the output image data have decreased blurring and decreased ghosting.

The at least two system matrices may be system matrices of different particle classes. A particle class is defined as magnetic particles that show a certain signal behavior during an MPI measurement, i.e., have a similar signal response behavior. Particle classes can differ, e.g., by particle type, size, orientation, bonding ratios of the same particle type, temperature of the medium comprising the particles, viscosity of the medium comprising the particles.

In a special variant of the inventive method, one of the system matrices is a background system matrix in order to carry out a background correction (see below). A background system matrix is usually smaller than system matrices containing particle signals. However, this is not a problem as long as the two system matrices to be used to create the appended system matrix match in the frequency dimension.

In a highly advantageous variant, in step b) the selected voxel is the voxel of the input image data (cin(r)) with the highest signal intensity. In this way, the voxels that are most likely not to be artifacts are added to the output signal data.

As an alternative to the voxel with the highest intensity, voxel(s) can be selected that has(have) another specific relevant property, e.g., particles that relate to a specific manually selectable region of interest. This can be relevant, for example, if the highest intensity is in vessels but one would only be interested in tissue.

In a special variant of the inventive method, more than one voxel is selected in step b), in particular all voxels having intensities exceeding a predefined selection threshold. If multiple voxels are selected in one cycle, several lines are selected from the system matrix in step c) accordingly.

In one advantageous embodiment, a selection threshold is determined such that all selected voxels are above a blurring intensity (blurring threshold).

In order to have a clear discrimination between real signals and their ghosts, the voxels selected within one cycle are preferably selected of the same system matrix, i.e., from that part of the appended system matrix which arises from only one of the system matrices, i.e the selection is limited to one particle class.

It is highly advantageous that a termination condition is determined and that the termination condition is met, if the intensities of all voxels of the updated input image data fall below a noise threshold. To set the noise threshold, the noise level can be estimated. The selection threshold must be selected higher than the noise threshold.

In a highly preferred variant, the same reconstruction parameters are used for the reconstruction of the signal data in step a) and for the eigen-reconstruction of the eigen-reconstruction signal data in step d). By using the same reconstruction parameters, artifacts (blurring and ghosting) arising from the eigen-reconstruction match the artifacts from the input image.

Reconstruction parameter can be, e.g., the parameter λ for the linear equation system or the number of iterations.

The linear equation system can be described as:

$$\arg\min.\|Sc-u\|_2^2+\lambda\|c\|_2^2$$

where S is the system matrix,
c is the concentration vector (local tracer concentration of the particles in the object)
u is the measured signal vector,
λ is the regularization parameter and
$\|\cdot\|_2^2$ indicates the L2-norm.

Alternatively, different reconstruction parameters can be used for the reconstruction of the signal data in step a) and for the eigen-reconstruction of the eigen-reconstruction signal data in step d). In particular, a smaller λ could be used for eigen-reconstruction than for reconstruction of image data. The larger λ is, the less susceptible the reconstruction is to noise, but the poorer the image resolution is. Therefore, when using a smaller λ, one accepts a worse SNR for self-reconstruction.

The inventive method may be used for determining the distribution of different tracers or of differently bound tracers within a system to be examined. A tracer is a substance foreign to the system to be examined, which (in case of a living system), after being introduced into the system, participates in the metabolism. In particular, the inventive method can be used to separate two tracers mixed in the same voxel.

The method according to the invention can be further used for determining whether a medium comprising the magnetic particles exceeds or falls below a threshold temperature and/or a threshold viscosity. Even without exact determination of the temperature or viscosity of the medium, the method according to the invention can be used to determine whether the viscosity and/or temperature of the medium is greater or less than the viscosity and/or temperature for which the corresponding system matrices are available. The method according to the invention can therefore be used for theragnostic purposes where a specific temperature must not be exceeded.

The method can also be used to separate two tracers mixed in the same voxel.

Further, the method according to the invention can be used for background correction, wherein at least one of the matrices is a background matrix, i.e., a matrix that does not contain particle signal information. The background matrix may be a vector.

The invention also concerns a system for visual representation of MPI image data of a local concentration distribution of magnetic particles or a value derived from this concentration distribution, comprising:
  (i) an MPI apparatus for acquiring MPI signal data,
  (ii) a stored computer program configured to generate an appended system matrix from at least two system matrices,
  (iii) a stored computer program configured to perform a reconstruction of the MPI image data by means of the appended system matrix can be carried out, and
  (iv) a display device configured to display the reconstructed MPI image data, wherein the system is configured to perform the previously described method.

The inventive method and system enable reducing ghosting and blurring artifacts, and noise cut-off in multi-color reconstruction, in particular when using the iterative approach.

Further advantages of the invention can be derived from the description and the drawings. Likewise, the above-mentioned and the still further described features can be used according to the invention individually or in any combination. The embodiments shown and described are not to be understood as a conclusive list, but rather have an exemplary character for the description of the invention.

BRIEF DESCRIPTION OF THE DRAWINGS

FIG. 3 shows a schematic illustration of a system according to the invention.

DETAILED DESCRIPTION

Figure 1A:
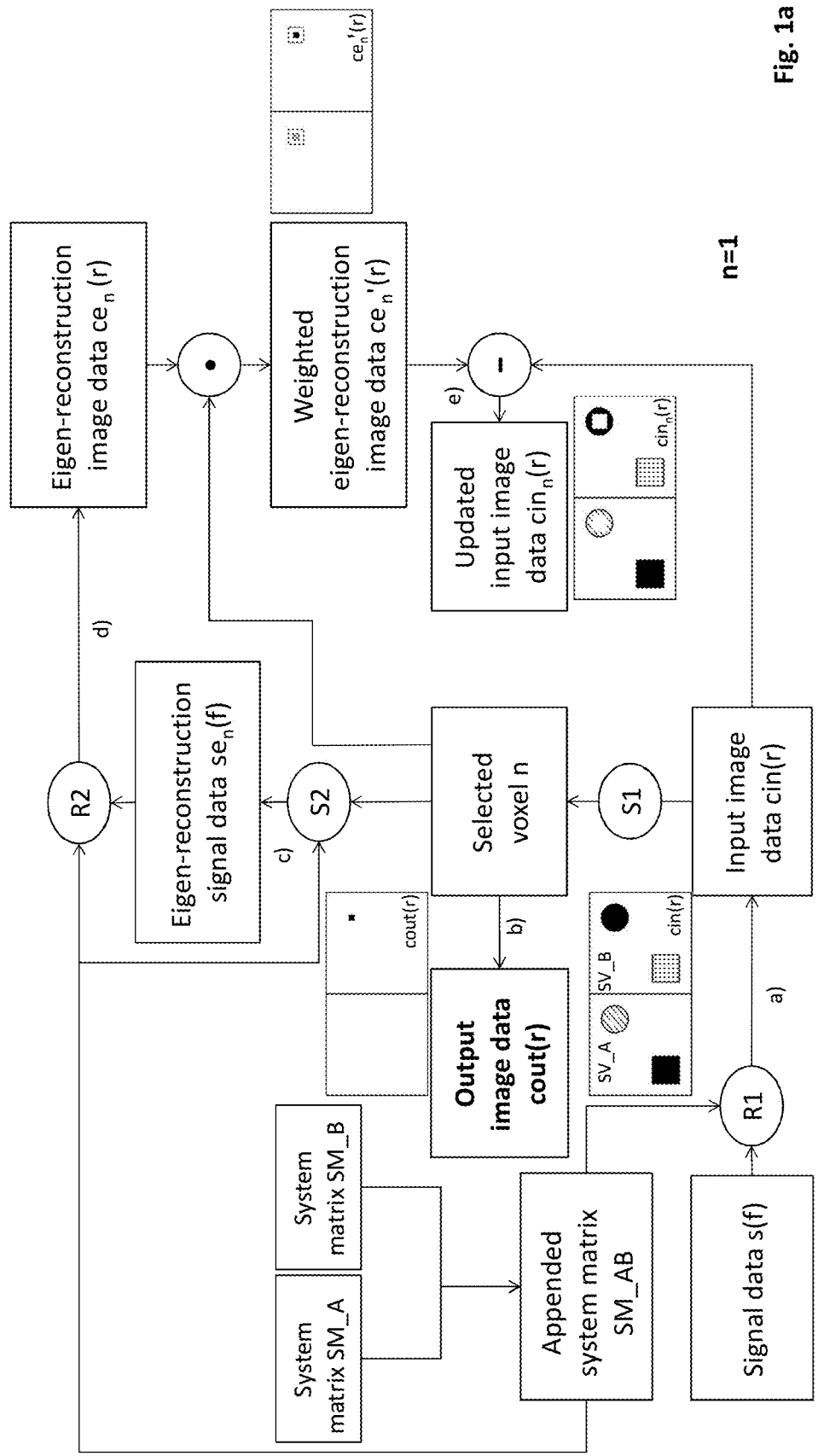
FIG. 1a shows a flowchart of the first iteration of a first variant of the method according to the invention with weighting of eigen-reconstruction image data.
Figure 1B:
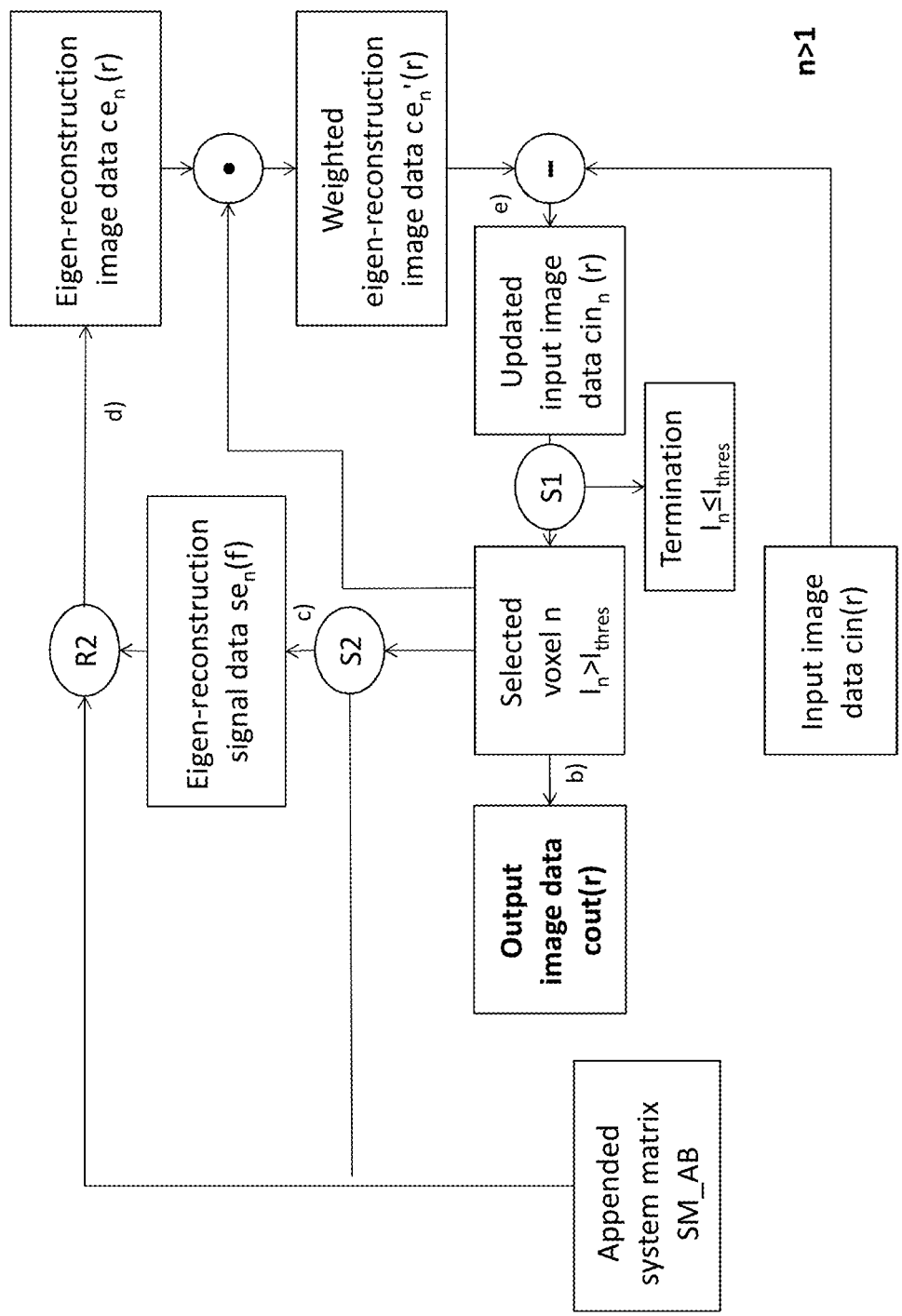
FIG. 1b shows a flowchart of further iterations of a first variant of the method according to the invention with weighting of eigen-reconstruction image data.
Figure 4C:
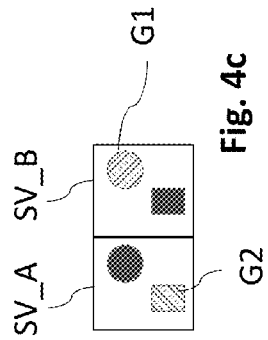
FIG. 4c schematically shows an input image data with partial volumes for each particle class of the phantom MPI sample shown in FIG. 2a, reconstructed with a method without ghost correction.
Figure 4B:
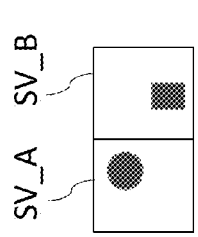
FIG. 4b schematically shows the input image data that should arise for the phantom MPI sample shown in FIG. 2a post reconstruction.
Figure 4A:
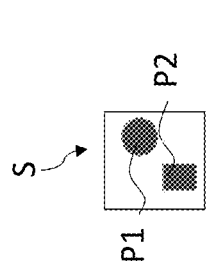
FIG. 4a shows a phantom MPI sample with different particle classes.

FIGS. 1a and 1b show flowcharts of iterations of a first variant of the method according to the invention. An appended system matrix SM_AB is generated from individual system matrices SM_A, SM_B for different particle classes P1, P2. Input image data cin(r) is reconstructed using MPI signal data s(f) and the appended system matrix SM_AB in a reconstruction operation R1 in the first iteration n=1 (FIG. 1a). A corresponding illustration of the reconstructed input image data cin(r) (step a) is shown in exemplary fashion in FIG. 1a for a sample S with partial volumes SV_A, SV_B as shown in FIG. 4c.

According to the invention, at least one voxel (in particular the voxel(s) with the highest intensity) of the input image data cin(r) is selected in a selection operation S1 (step b). In the present example the voxel(s) is(are) selected from the partial volume SV_B with particle class P2. The selected voxel(s) is (are) stored as output image data cout(r). A corresponding illustration of the output image data cout(r) is shown in exemplary fashion in FIG. 1a.

For the selected voxel(s), the corresponding line entry (entries) of system matrix of the appended system matrix SM_AB is(are) selected in a further selection operation S2. The selected line entry(entries) of system matrix is(are) referred to as eigen-reconstruction signal data $se_n(f)$. In practice, the selection is done from the appended system matrix SM_AB. However, it is also possible to extract this information from the individual matrices SM_A or SM_B, respectively.

In a subsequent reconstruction operation R2, eigen-reconstruction image data $ce_n(r)$ are generated from the eigen-reconstruction signal data $se_n(f)$ by using the appended system matrix SM_AB. A corresponding illustration of the eigen-reconstruction image data $ce_n(r)$ is shown in exemplary fashion in FIG. 1a. In addition to the "perfect reconstruction data", i.e., the image data of the selected voxel(s) (depicted as black small square), the eigen-reconstruction image data $ce_n(r)$ further comprise reconstruction artifacts such as blurring artifacts (depicted as white large square) in partial volume SV_B and ghost artifacts (depicted as cross-hatched small square and white large square) in partial volume SV_A.

While the selected voxel(s) is(are) stored as output image data cout(r), the eigen-reconstruction image data $ce_n(r)$ are weighted into weighted eigen-reconstruction image data $ce_n'(r)$, such that the voxel intensity of selected voxel and the intensity of the corresponding voxel of the weighted eigen-reconstruction image data $ce_n'(r)$ are equivalent. The weighted eigen-reconstruction image data $ce_n'(r)$ are then subtracted from the input image data cin(r) in order to generate updated input image data $cin_n(r)$. A corresponding illustration of the input image data $cin_n(r)$ is shown in exemplary fashion in FIG. 1a. The updated input image data $cin_n(r)$ ideally do not contain any reconstruction data resulting from the selected voxel(s).

The output image data cout(r) generated so far are preliminary and are preferably supplemented by subsequent iterations, as shown in FIG. 1b. For the next iteration of the method according to the invention, the updated input image data $cin_n(r)$ are used as basis for the selection operation to select further voxel(s) (in particular the voxel(s) with the next highest intensity). The further selected voxel(s) is(are) added to the output image data cout(r). In analogy to the first iteration, selection operation S1 to select the line entry (entries) of system matrix corresponding to the further selected voxel(s) from the appended system matrix SM_AB, reconstruction operation R2, weighting and subtraction operation are performed to update the updated input data again.

With each iteration, selected voxels are added to the output image data cout(r) and artifacts are removed from the updated input image data $cin_n(r)$ for further selection. By defining a termination condition such that the termination condition is met if the intensities $I_n$ of all voxels of the updated input image data fall below a noise threshold $I_{thres}$, it is possible to minimize noise data in the output image data. The output image data cout(r) obtained by the inventive method shows decreased blurring, decreased ghosting, and a decreased noise level compared to the standard reconstruction and the ghost correction algorithms as described by U.S. Pat. No. 10,796,465 B2.

If the method according to the invention is stopped after one or so few iterations that it may not be sufficient to have selected all relevant image data, the updated input image data $cin_n(r)$ can be added to the output image data cout(r) in a final method step (not shown). By doing so, not all, but at least the most significant artifacts would be removed.

In the variant shown in FIGS. 1a, 1b a weighting is performed prior to step e) (subtraction from input image data cin(r)). The weighting ensures that the data subtracted from the input image data have the correct intensity. That is, the maximum intensity of the voxel(s) of the eigen-reconstruction image data $ce_n(r)$, corresponding to the selected image data (voxels of the eigen-reconstruction image data $ce_n(r)$ that are no artifacts) should match with the intensity of the corresponding selected voxel of the input image data cin(r) or updated input image data $cin_n(r)$ respectively. In order to obtain weighted eigen-reconstruction image data, whose maximum intensity matches with the intensity of the selected voxel, the weighting operation performed in FIGS. 1a, 1b comprises multiplication of the eigen-reconstruction image data $ce_n(r)$ with a weighting factor.

Figure 2:
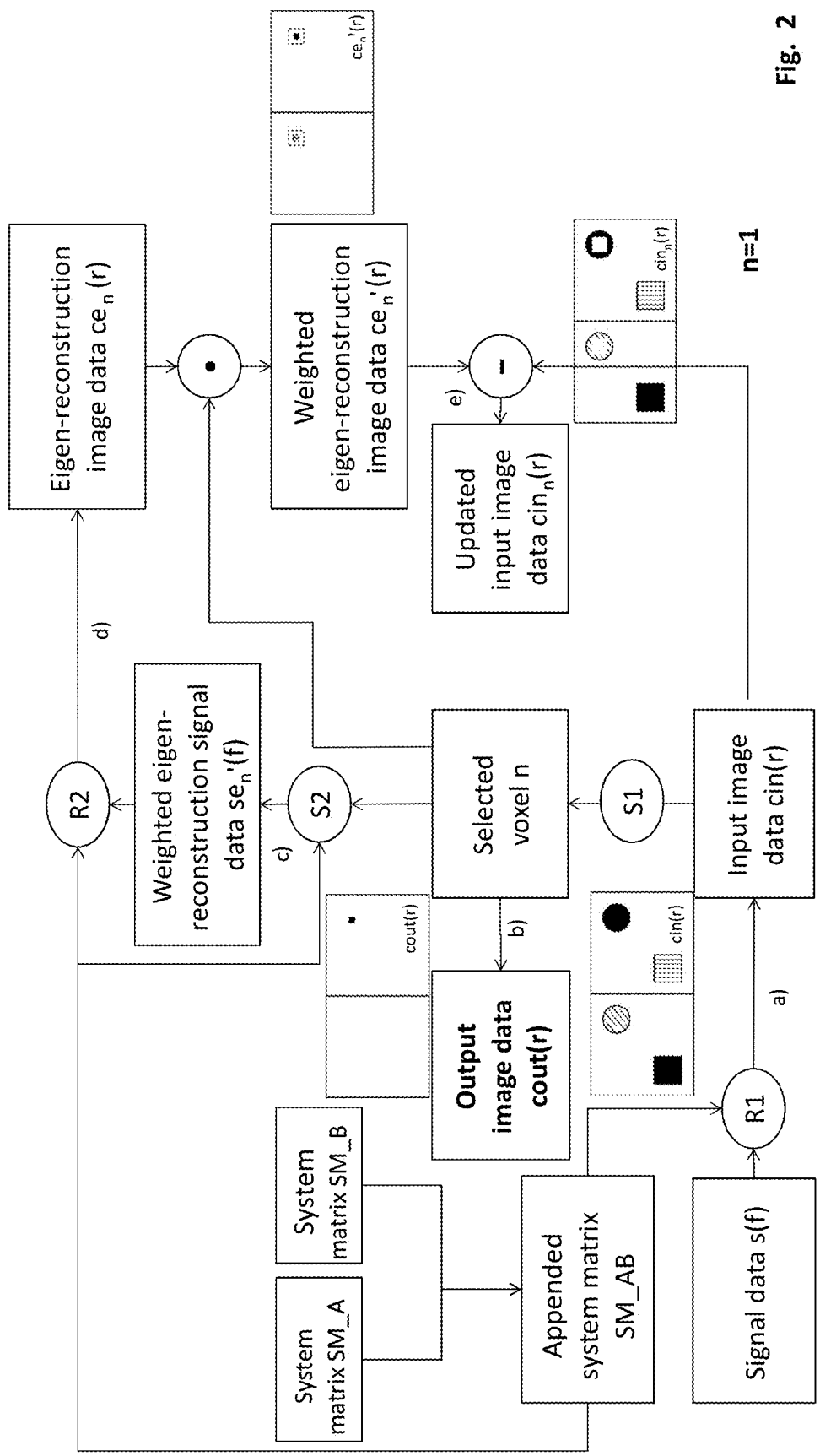
FIG. 2 shows a flowchart of the first iteration of a second variant of the method according to the invention with weighting of selected signal data.

FIG. 2 shows an alternative variant of the method according to the invention where another weighting is performed prior to step c). The aforesaid other weighting is performed in the frequency domain. The system matrix entry line(s) of the appended system matrix SM_AB is(are) multiplied with voxel intensity to generate the intensity weighted spectrum in order to achieve weighted eigen-reconstruction signal data $se_n'(f)$. This frequency domain weighting can be performed in addition (as shown in FIG. 2) or as an alternative to the spatial domain weighting shown in FIGS. 1a, 1b.

The system according to the invention, by which the method can be performed, is shown in FIG. 3. It comprises an MPI apparatus 1 with coil arrangements 10, 11, 12 for producing a spatially dependent magnetic field and a magnetic drive field within an examination volume 13. The coils of the coil arrangement 10, 11 shown in FIG. 3 comprise transmit-receive coils. Alternatively separate transmit coils and receive coils can be used. MPI signal data u(t) in the time domain from which signal data s(f) in the frequency domain can be calculated is detected by the MPI apparatus 1. Moreover, the system according to the invention comprises a device 2 for generating an appended system matrix SM_AB from system matrices for different particle classes.

The appended system matrix SM_AB and the MPI signal data u(t) or s(f) are supplied to a reconstruction device 3 (e.g., a linear solver) for the purposes of reconstructing an input image data cin(r) (spatial domain) from the MPI signal data u(t) and s(f) and the appended system matrix SM_AB.

The reconstruction device 3 of the inventive system comprises a stored computer program which is configured to select at least one voxel as selected voxel from the input image data cin(r) for generating output image data cout(r), where ghost and blurring artifacts are eliminated or at least reduced compared to the input image data. The reconstruction device 3 can be incorporated in the system's PC. The system further comprises a display device 4, which presents the output data cout(r).

LIST OF REFERENCE SIGNS

1 MPI apparatus
2 device for generating an appended system matrix
3 reconstruction device
4 display device
10, 11, 12 coil arrangements
13 examination volume
$ce_n(r)$ eigen-reconstruction image data (spatial domain)
$ce_n'(r)$ weighted eigen-reconstruction image data
cin(r) input image data
$cin_n(r)$ updated input image data
cout(r) output image data
$se_n(f)$ eigen-reconstruction signal data
$se_n'(f)$ weighted eigen-reconstruction signal data
s(f) signal data in the frequency domain
u(t) signal data in the time domain
G1 Ghost artifact of particle class 1 in partial volume 2
G2 Ghost artifact of particle class 2 in partial volume 1
$I_n$ voxel intensity
$I_{thres}$ noise threshold
P1 Particle class 1
P2 Particle class 2
R1, R2 reconstruction operation
S sample
S1, S2 selection operation
SM_A individual system matrix of particle class 1
SM_B individual system matrix of particle class 2
SM_AB appended system matrix
SV_A Partial volume of particle class 1
SV_B Partial volume of particle class 2

The invention claimed is:

1. A method for reducing artifacts arising from reconstruction of a magnetic particle imaging (MPI) total image data set (c(r)) from MPI signal data, the method comprising:
   a1) providing MPI signal data (s(f), u(t)) acquired from a sample using an MPI apparatus;
   a2) reconstructing signal data (s(f), u(t)) by means of an appended system matrix (SM_AB) derived from at least two system matrices (SM_A, SM_B) for generating input image data (cin(r)),
   b) selecting at least one voxel as selected voxel from the input image data (cin(r)) for generating output image data (cout(r)),
   c) determining eigen-reconstruction signal data $se_n(f)$ by selecting at least one line entry of the appended system matrix (SM_AB) which corresponds to the at least one selected voxel,
   d) reconstructing the eigen-reconstruction signal data $se_n(f)$ using the appended system matrix (SM_AB) for generating eigen-reconstruction image data ce(r),
   e) subtracting the eigen-reconstruction image data ce(r) or weighted eigen-reconstruction image data ce'(r) from the input image data cin(r) for generating updated input image data $cin_n'(r)$;
   f) repeating steps b)-e) until a termination condition is met, wherein in step b) the selection is made from the updated input image data $cin_n'(r)$ and wherein at least one selected voxel is added to the output image data cout(r); and
   g) outputting, after the termination condition is met, the output image data cout(r) to a display device.

2. The method according to claim 1, wherein prior to step e) the eigen-reconstruction image data $ce_n(r)$ obtained in step d) is multiplied with a weighting factor to obtain weighted Eigen-reconstruction image data $ce_n'(r)$ whose maximum intensity matches with the intensity of the selected voxel, and wherein in step e) the weighted eigen-reconstruction image data $ce_n'(r)$ are used for subtraction.

3. The method according to claim 1, wherein prior to step d) the eigen-reconstruction signal data $se_n(f)$ obtained in step c) is multiplied with a weighting factor to obtain weighted eigen-reconstruction signal data $se'_n(f)$ whose maximum intensity matches with an intensity of the selected voxel, and wherein in step d) the weighted eigen-reconstruction signal data $se'_n(f)$ are used for eigen-reconstruction.

4. The method according to claim 1, wherein the at least two system matrices (SM_A, SM_B) are system matrices (SM_A, SM_B) of different particle classes (P1, P2).

5. The method according to claim 1, wherein in step b) the selected voxel is a voxel of the input image data (cin(r)) having a highest signal intensity.

6. The method according to claim 1, wherein in step b) more than one voxel is selected.

7. The method according to claim 6, wherein all voxels having intensities exceeding a predefined selection threshold are selected.

8. The method according to claim 1, wherein a termination condition is determined and wherein the termination condition is met if intensities of all voxels of the updated input image data fall below a noise threshold.

9. The method according to claim 1, wherein the same reconstruction parameters are used for the reconstruction of the signal data in step a2) and for the eigen-reconstruction of the eigen-reconstruction signal data in step d).

10. The method according to claim 1 wherein different reconstruction parameters are used for the reconstruction of the signal data in step a2) and for the eigen-reconstruction of the eigen-reconstruction signal data in step d).

11. The method according to claim 1, further comprising determining a distribution of tracers or of differently bound tracers within the sample being examined.

12. The method according to claim 1 wherein the MPI signal data comprises signals collected from a medium containing particles that vary in size, shape and magnetic properties, and wherein the method further comprises determining whether the medium comprising the particles exceeds or falls below a threshold temperature and/or a threshold viscosity.

13. The method according to claim 1 wherein at least one of the matrices is a background system matrix that does not contain particle signal information, and wherein the method further comprises performing a background correction of the MPI signal data.

14. A system for visual representation of MPI image data (cout(r)) of a local concentration distribution of magnetic particles or a value derived from said concentration distribution, wherein the system is configured to perform the method according to claim 1, comprising:
- (i) said MPI apparatus for acquiring the MPI signal data $s(f)$, $u(t)$),
- (ii) a stored computer program that, when executed, generates the appended system matrix (SM_AB) from the at least two system matrices (SM_A, SM_B),
- (iii) a stored computer program that, when executed, carries out the reconstruction of the eigen-reconstruction signal data $se_n(f)$ using the appended system matrix (SM_AB), and
- (iv) said display device configured to display said output image data $cout(r)$.

* * * * *